(12) United States Patent
Shoemaker et al.

(10) Patent No.: US 9,746,064 B2
(45) Date of Patent: Aug. 29, 2017

(54) DUAL CLUTCH DRIVE MODULE WITH SINGLE SERVO HYDRAULIC PUMP AND NORMALLY-OPEN VALVE ACTUATION

(71) Applicant: American Axle & Manufacturing, Inc., Detroit, MI (US)

(72) Inventors: Kent A. Shoemaker, Goodrich, MI (US); Charles G. Stuart, Rochester Hills, MI (US); James P. Downs, South Lyon, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 302 days.

(21) Appl. No.: 14/598,559

(22) Filed: Jan. 16, 2015

(65) Prior Publication Data

US 2016/0208900 A1 Jul. 21, 2016

(51) Int. Cl.
| | |
|---|---|
| *F16H 48/36* | (2012.01) |
| *F16H 48/22* | (2006.01) |
| *F16H 48/08* | (2006.01) |
| *F16H 57/04* | (2010.01) |
| *F16D 13/52* | (2006.01) |
| *F16D 13/74* | (2006.01) |

(52) U.S. Cl.
CPC .......... *F16H 48/36* (2013.01); *F16D 13/52* (2013.01); *F16D 13/74* (2013.01); *F16H 48/08* (2013.01); *F16H 48/22* (2013.01); *F16H 57/0473* (2013.01); *F16H 57/0483* (2013.01); *F16H 2048/364* (2013.01)

(58) Field of Classification Search
None
See application file for complete search history.

(56) References Cited

U.S. PATENT DOCUMENTS

| | | | |
|---|---|---|---|
| 4,681,180 A | 7/1987 | Oyama et al. | |
| 5,119,900 A | 6/1992 | Watanabe et al. | |
| 5,135,071 A | 8/1992 | Shibahata et al. | |
| 5,279,384 A * | 1/1994 | Shibahata ............ | B60K 17/348 180/248 |
| 5,353,889 A | 10/1994 | Hamada | |
| 5,370,588 A | 12/1994 | Sawase et al. | |
| 5,415,598 A | 5/1995 | Sawase et al. | |
| 5,417,298 A | 5/1995 | Shibahata | |
| 5,456,641 A | 10/1995 | Sawase | |
| 5,669,406 A * | 9/1997 | Gluf, Jr. ............ | F16K 31/0637 137/270 |
| 5,690,002 A | 11/1997 | Showalter | |
| 5,699,888 A | 12/1997 | Showalter | |
| 5,839,328 A | 11/1998 | Showalter | |
| 5,884,738 A | 3/1999 | Joslin et al. | |
| 5,904,634 A | 5/1999 | Teraoka | |

(Continued)

*Primary Examiner* — Derek D Knight
*Assistant Examiner* — Timothy M Hannon
(74) *Attorney, Agent, or Firm* — Harness, Dickey & Pierce, P.L.C.

(57) ABSTRACT

A vehicle driveline component having a dual friction clutch differential assembly and a hydraulic circuit for operating the friction clutches. The hydraulic circuit includes a pair of normally open, solenoid operated valves that are selectively closed to control the fluid pressure that acts on the friction clutches. The hydraulic circuit provides a simplified and cost-effective means for providing disconnecting and/or torque vectoring capabilities to the vehicle driveline component.

20 Claims, 4 Drawing Sheets

(56) References Cited

U.S. PATENT DOCUMENTS

| | | |
|---|---|---|
| 5,910,064 A | 6/1999 | Kuroki |
| 5,966,999 A | 10/1999 | Showalter et al. |
| 6,070,495 A | 6/2000 | Kuroda et al. |
| 6,095,276 A | 8/2000 | Kuroda et al. |
| 6,327,935 B1 | 12/2001 | Joslin et al. |
| 6,461,267 B1 | 10/2002 | Paielli |
| 6,622,837 B2 | 9/2003 | Ochab et al. |
| 6,681,913 B2 * | 1/2004 | Lee .................. B60K 17/3505 192/103 F |
| 6,817,434 B1 | 11/2004 | Sweet |
| 6,945,374 B2 | 9/2005 | Puiu |
| 7,004,876 B2 | 2/2006 | Puiu |
| 7,007,763 B2 | 3/2006 | Ginther et al. |
| 7,044,878 B2 | 5/2006 | Murakami |
| 7,059,991 B2 | 6/2006 | Puiu |
| 7,111,702 B2 | 9/2006 | Perlick et al. |
| 7,258,187 B2 | 8/2007 | Bowen |
| 7,278,947 B2 | 10/2007 | Puiu |
| 7,281,617 B2 | 10/2007 | Puiu |
| 7,361,113 B2 | 4/2008 | Puiu et al. |
| 7,395,736 B2 | 7/2008 | Davidsson et al. |
| 7,491,147 B2 | 2/2009 | Ross |
| 7,503,866 B2 | 3/2009 | Puiu et al. |
| 7,530,421 B2 | 5/2009 | Mori et al. |
| 7,584,832 B2 | 9/2009 | Baasch et al. |
| 7,793,749 B2 | 9/2010 | Baasch et al. |
| 7,951,035 B2 | 5/2011 | Platt |
| 8,083,636 B2 | 12/2011 | Showalter |
| 8,584,785 B2 | 11/2013 | Marsh et al. |
| 2004/0129475 A1 * | 7/2004 | Forsyth .................. B60K 17/34 180/233 |
| 2008/0176702 A1 | 7/2008 | Showalter |
| 2008/0182695 A1 | 7/2008 | Showalter |
| 2009/0253548 A1 | 10/2009 | Showalter |
| 2009/0298648 A1 * | 12/2009 | Sigmund ............ F16D 48/0206 477/169 |
| 2011/0087409 A1 | 4/2011 | Severinsson et al. |
| 2013/0199883 A1 * | 8/2013 | Akiba .................. F16D 25/082 192/48.609 |
| 2014/0305116 A1 * | 10/2014 | Hiyoshi ................ F16H 48/145 60/393 |
| 2016/0169359 A1 * | 6/2016 | Edler .................... F16H 48/32 475/88 |

* cited by examiner

DUAL CLUTCH DRIVE MODULE WITH SINGLE SERVO HYDRAULIC PUMP AND NORMALLY-OPEN VALVE ACTUATION

FIELD

The present disclosure relates to a dual clutch drive module with a single servo hydraulic pump and normally-open valve actuation.

BACKGROUND

This section provides background information related to the present disclosure which is not necessarily prior art.

One trend in automotive drivelines relates to an all-wheel drive driveline with an axle assembly having disconnecting and/or torque vectoring capabilities. Disconnecting capabilities permit the driveline to be selectively operated in a two-wheel drive mode as a means for improving fuel economy. Torque vectoring capabilities permit the driveline to alter the torque that would otherwise be applied to a pair of vehicle wheels that are driven by the axle to correct for understeer or oversteer in some situations.

One type of axle assembly that is capable of providing disconnecting and/or torque-vectoring capabilities is an axle assembly that employs a pair of friction clutches to provide speed differentiation between a pair of vehicle wheels. The known dual friction clutch differential arrangements, however, require complex mechanisms and/or hydraulic circuits to control the operation of the friction clutches. Accordingly, there is a need in the art for an axle assembly having a dual friction clutch differential arrangement with a simplified actuation means for operating the friction clutches.

SUMMARY

This section provides a general summary of the disclosure, and is not a comprehensive disclosure of its full scope or all of its features.

In one form, the present disclosure provides a vehicle driveline component that includes a housing, an input pinion received in the housing and rotatably disposed about a first axis, a ring gear received in the housing and rotatably disposed about a second axis, a differential assembly mounted in the housing for rotation about the second axis, and a hydraulic circuit. The differential assembly has a differential case, a first friction clutch and a second friction clutch. The differential case is coupled to the ring gear for common rotation. The first friction clutch has a first input portion, which is coupled to the differential case for common rotation, and a first output portion. The second friction clutch has a second input portion, which is coupled to the differential case for common rotation, and a second output portion. The hydraulic circuit includes a reservoir, a first cylinder assembly, a second cylinder assembly, a first valve, a second valve, an electric motor, a pump, a first flow control device and a second flow control device. The reservoir is configured to hold a hydraulic fluid. The first cylinder assembly is configured to selectively actuate the first friction clutch and includes a first piston that is received in a first chamber. The second cylinder assembly is configured to selectively actuate the second friction clutch and includes a second piston that is received in a second chamber. The first valve is a solenoid operated, normally open two-way valve with a first outlet port, which is in fluid communication with the first chamber, and a first inlet port. The second valve is a solenoid operated, normally open two-way valve with a second outlet port, which is in fluid communication with the second chamber, and a second inlet port. The electric motor is selectively operable for driving the pump. The pump is configured to draw hydraulic fluid from the reservoir and provide pressurized hydraulic fluid to the first and second inlet ports. The first flow control device is in fluid communication with the first chamber and the reservoir. The second flow control device is in fluid communication with the second chamber and the reservoir.

In another form, the present disclosure provides a method for operating a driveline component having a housing, an input pinion received in the housing and rotatably disposed about a first axis, a ring gear received in the housing and rotatably disposed about a second axis, and a differential assembly mounted in the housing for rotation about the second axis. The differential assembly has a differential case, a first friction clutch and a second friction clutch. The differential case is coupled to the ring gear for common rotation. The first friction clutch has a first input portion, which is coupled to the differential case for common rotation, a first output portion, and a first clutch cylinder assembly that is configured to output a force to selectively engage the first output portion and the first input portion. The second friction clutch has a second input portion, which is coupled to the differential case for common rotation, a second output portion and a second clutch cylinder assembly that is configured to output a force to selectively engage the second output portion and the second input portion. The method includes: operating a pump to provide pressurized hydraulic fluid to a first normally open valve and a second normally open valve, the first normally open valve being in fluid communication with the first clutch cylinder assembly, the second normally open valve being in fluid communication with the second clutch cylinder assembly; providing first and second flow control devices, the first flow control device being configured to vent fluid from the first clutch cylinder assembly, the second flow control device being configured to vent fluid from the second clutch cylinder assembly; sensing a first parameter indicative of the force output by the first clutch cylinder assembly; sensing a second parameter indicative of the force output by the second clutch cylinder assembly; operating the first normally open valve based in part on the first parameter; and operating the second normally open valve based in part on the second parameter. The first and second normally open valves are operated independently of one another.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

Figure 1:
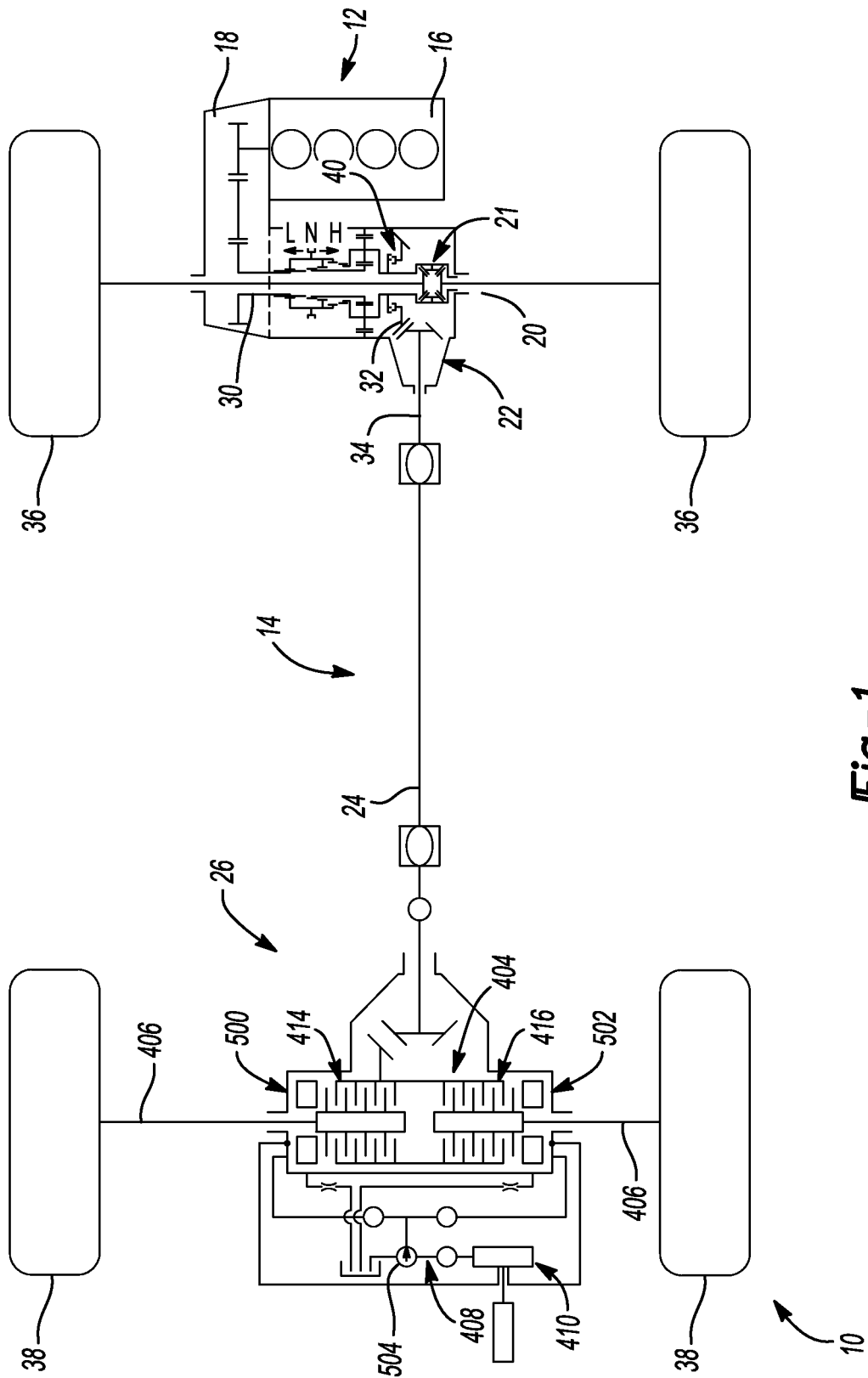
FIG. 1 is a schematic illustration of an exemplary vehicle having a vehicle driveline constructed in accordance with the teachings of the present disclosure.

With reference to FIG. 1 of the drawings, an exemplary vehicle having a vehicle driveline component constructed in accordance with the teachings of the present disclosure is generally indicated by reference numeral 10. The vehicle 10 can have a power train 12 and a drive line or drive train 14. The power train 12 can be conventionally constructed and can comprise a power source 16 and a transmission 18. The power source 16 can be configured to provide propulsive power and can comprise an internal combustion engine and/or an electric motor, for example. The transmission 18 can receive propulsive power from the power source 16 and can output power to the drive train 14. The transmission 18 can have a plurality of automatically or manually-selected gear ratios. The drive train 14 in the particular example provided is of an all-wheel drive configuration, but those of skill in the art will appreciate that the teachings of the present disclosure are applicable to other drive train configurations, including four-wheel drive configurations, rear-wheel drive configurations, and front-wheel drive configurations.

The drive train 14 can include a front axle assembly 20, a power take-off unit (PTU) 22, a prop shaft 24 and a rear axle assembly 26. In the particular example provided, the vehicle driveline component is the rear axle axle assembly 26, but those of skill in the art will appreciate that the teachings of the present disclosure have application to other types of driveline components, including front axle assemblies and interaxle differential devices (e.g., transfer cases, center differentials). An output of the transmission 18 can be coupled to an input of the front axle assembly 20 to drive an input member 30 of the front axle assembly 20. The PTU 22 can have a PTU input member 32, which can receive rotary power from the input member 30 of the front axle assembly 20, and a PTU output member 34 that can transmit rotary power to the prop shaft 24. The prop shaft 24 can couple the PTU output member 34 to the rear axle assembly 26 such that rotary power output by the PTU 22 is received by the rear axle assembly 26. The front axle assembly 20 and the rear axle assembly 26 could be driven on a full-time basis to drive front and rear vehicle wheels 36 and 38, respectively. It will be appreciated, however, that the drive train 14 could include one or more clutches to interrupt the transmission of rotary power through a part of the drive train 14. In the particular example provided, the drive train 14 include a first clutch 40, which can be configured to interrupt the transmission of rotary power into or through the PTU 22.

The front axle assembly can be configured in a manner that is generally similar to that which is described in copending, commonly assigned U.S. patent application Ser. No. 13/785,425 filed Mar. 5, 2013, the disclosure of which is incorporated by reference as if fully set forth in detail herein. Briefly, the input member 30 of the front axle assembly 20 can drive a first differential assembly 21, which can provide rotary power to the front vehicle wheels 36.

Figure 2:
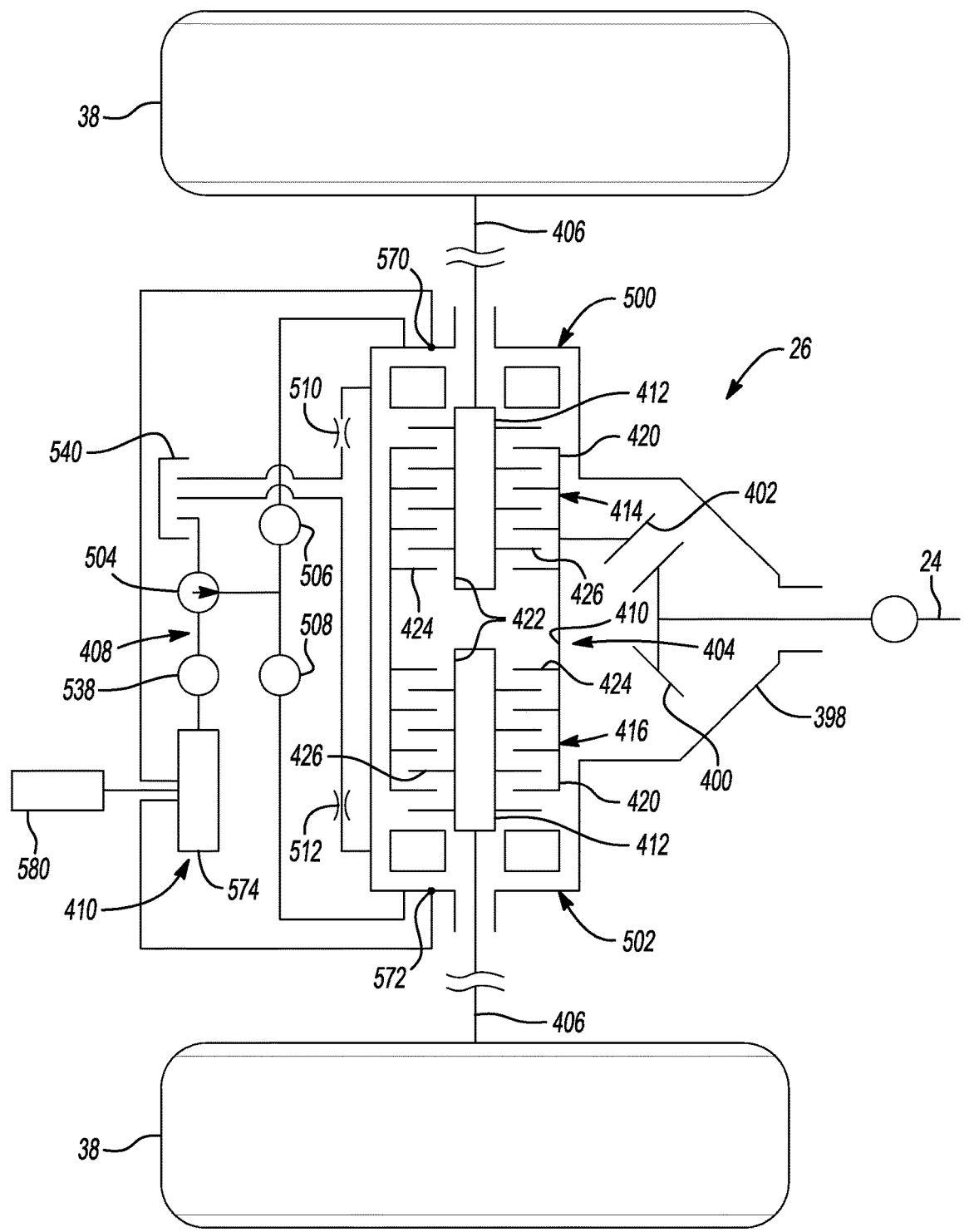
FIG. 2 is an enlarged portion of FIG. 1 illustrating the vehicle driveline component in more detail.

With reference to FIG. 2, the rear axle assembly 26 can include a housing 398, an input pinion 400, a bevel ring gear 402, a second differential assembly 404, a pair of shafts 406, a hydraulic circuit 408 and a control system 410. The input pinion 400 can be housed in the housing 398 for rotation about a first axis. The input pinion 400 can be coupled to an end of the propshaft 24 for rotation therewith. The second bevel ring gear 402 being meshed with the input pinion 400 and can be rotatable about a second axis that can be transverse or perpendicular to the first axis. In the example provided, the input pinion 400 and the bevel ring gear 402 form a hypoid gear set.

The second differential assembly 404 can be configured to receive rotary power transmitted through the second bevel ring gear 402 and can have a spool or differential case 410, a pair of output members 412, a first friction clutch 414 and a second friction clutch 416. The differential case 410 can comprise a generally tubular structure that can be coupled to the second bevel ring gear 402 for common rotation about the second axis. Each of the output members 412 can be drivingly coupled to a corresponding one of the shafts 406. The shafts 406 are configured to transmit rotary power between the output members 412 and the rear vehicle wheels 38.

Figure 3:
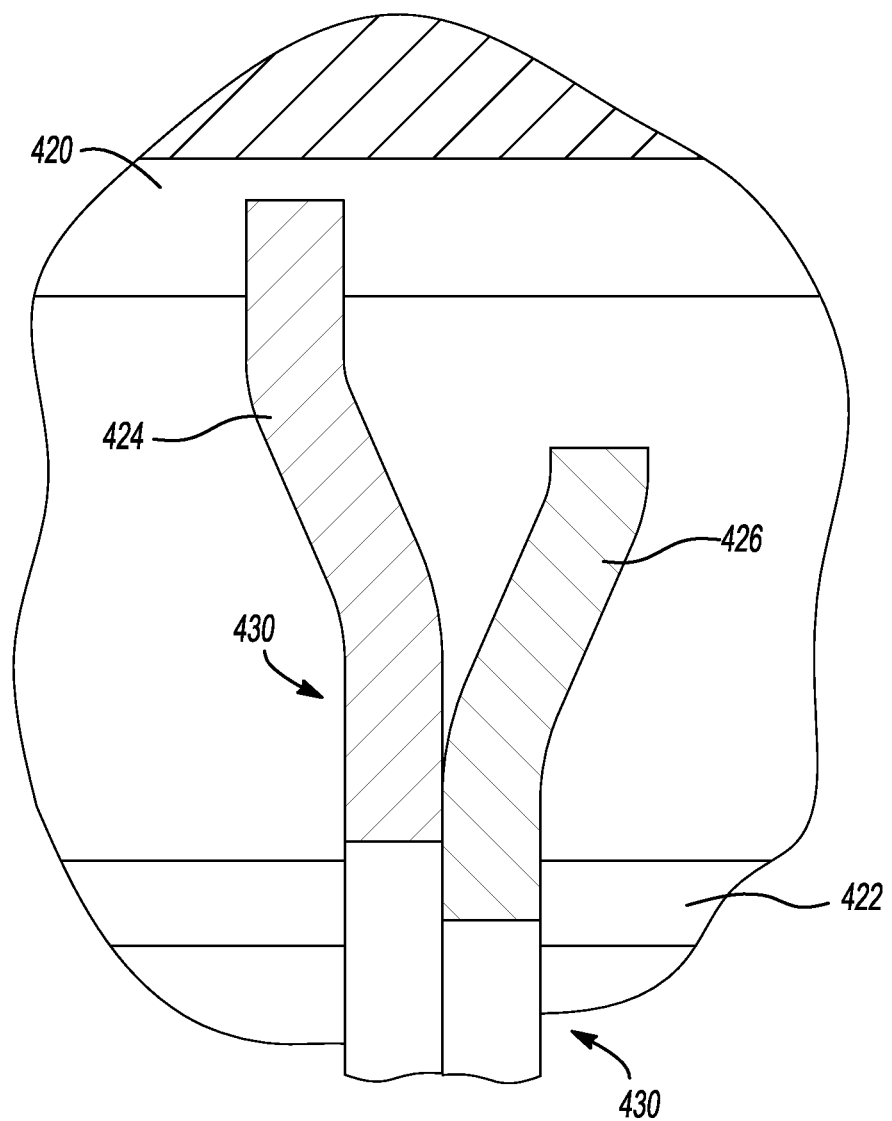
FIG. 3 is a section view of a portion of the vehicle driveline component.

In the particular example provided, each of the first and second friction clutches 414 and 416 has an outer clutch basket 420, which is coupled for rotation with the differential case 410, an inner clutch basket 422, which is coupled for rotation with a corresponding one of the output members 412, a plurality or set of first clutch or friction plates 424 and a plurality or set of second clutch or friction plates 426. Each set of the first friction plates 424 can be non-rotatably coupled but axially slidably mounted on a corresponding one of the outer clutch baskets 420. Each set of the second friction plates 426 can be non-rotatably coupled but axially slidably mounted on a corresponding one of the inner clutch baskets 422. The second friction plates 426 can be interleaved with the first friction plates 424. With brief reference to FIG. 3, the first and second friction plates 424 and 426 can comprise one or more springs 430 that can be configured to urge the first and second friction plates 424 and 426 apart from one another. In the example provided, the first and second friction plates 424 and 426 are formed as Belleville spring washers, but it will be appreciated that one or more springs could be integrated into the first friction plates 424 and/or the second friction plates 426 in a desired manner (e.g., one or more tabs that are integrally formed with the body of the friction plates that form leaf spring(s), discrete coil or leaf springs that are coupled to the first and/or second friction plates). Returning to FIG. 2, each of the inner clutch baskets 422 is drivingly coupled to an associated one of the output members 412 for common rotation about the second axis.

Figure 4:
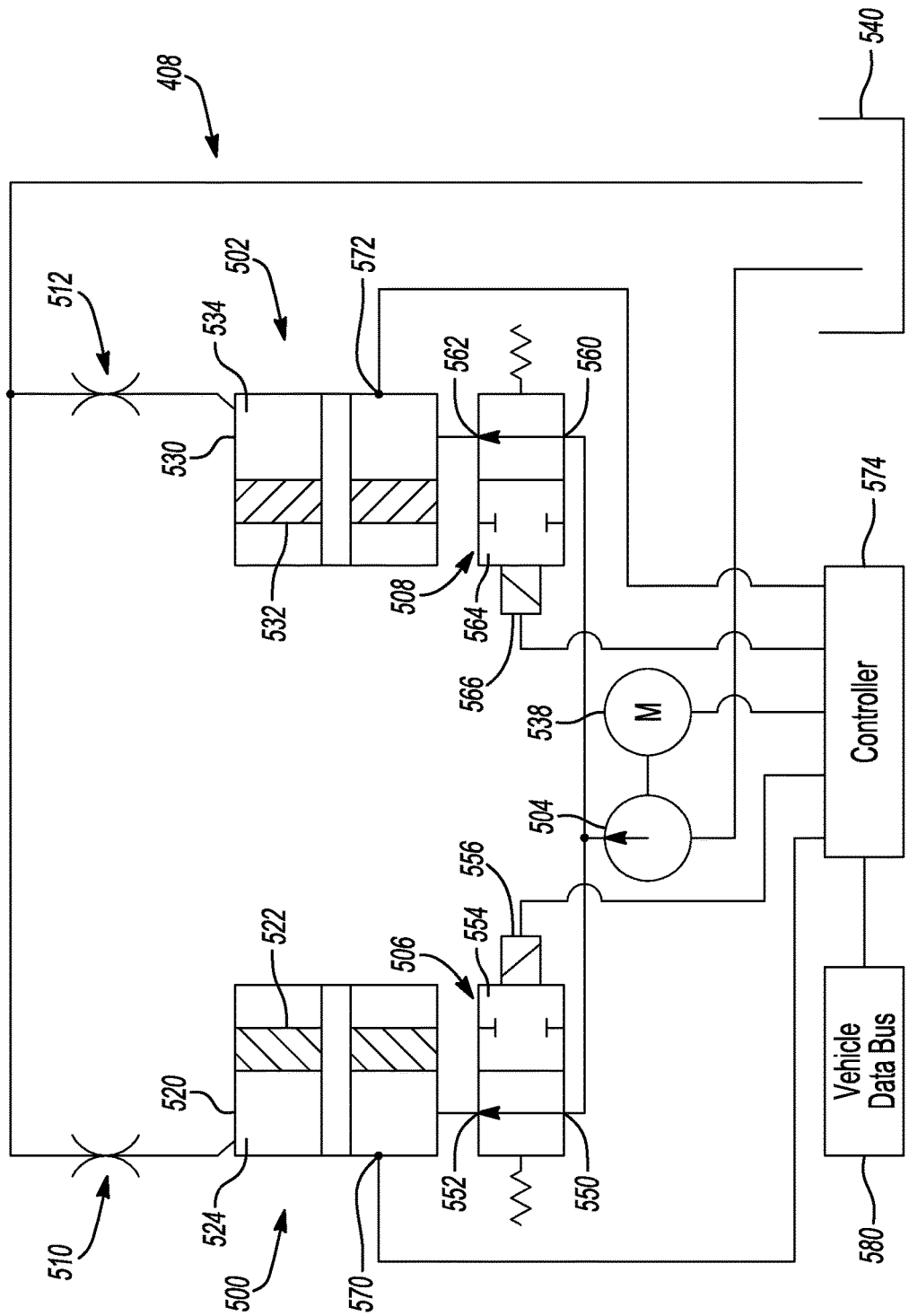
FIG. 4 is a schematic illustration of the vehicle driveline component.

With reference to FIG. 4, the hydraulic circuit 408 can comprise a first cylinder assembly 500, a second cylinder assembly 502, a pump 504, a first valve 506, a second valve 508, a first flow control device 510 and a second flow control device 512. The first cylinder assembly 500 is configured to selectively activate the first friction clutch 414 (FIG. 2) and can include a first cylinder 520 and a first piston 522. The first cylinder 520 can be fixedly coupled to the housing 398 (FIG. 2) and can define a first chamber or cavity 524 having an annular shape. The first piston 522 can be received in the first cavity 524 and is configured to output a force that causes the first and second friction plates 424 and 426 (FIG. 2) in the first friction clutch 414 (FIG. 2) to engage one another. The second cylinder assembly 502 can be similarly configured to selectively activate the second friction clutch 416 (FIG. 2) and can include a second cylinder 530 and a second piston 532. The second cylinder 530 can be fixedly coupled to the housing 398 (FIG. 2) and can define a second chamber or cavity 534 having an annular shape. The second piston 532 can be received in the second cavity 534 and is configured to output a force that causes the first and second friction plates 424 and 426 (FIG. 2) in the second friction clutch 416 (FIG. 2) to engage one another.

The pump 504 can be any type of pump, such as a gerotor pump, and is configured to be driven by an appropriate power source, such as an electric motor 538. The pump 504 is configured to draw a hydraulic fluid from a reservoir 540 and to provide pressurized hydraulic fluid to the first and second valves 506 and 508. In the particular example shown, the first and second valves 506 and 508 are hydraulically coupled to the pump 504 in a parallel manner, but it will be appreciated that pressurized hydraulic fluid could be provided to the first and second valves 506 and 508 in a different manner, such as in series.

The first valve 506 can be a two-way, normally open solenoid-operated valve having an inlet port 550, which receives pressurized hydraulic fluid from the pump 504, an outlet port 552, which is coupled in fluid communication with an inlet of the first cylinder assembly 500, a valve element 554 and a solenoid 556. The valve element 554 is biased into a first position (e.g., via a return spring) that permits fluid communication between the inlet port 550 and the outlet port 552. The solenoid 556 can be selectively operated to move the valve element 554 into a second position that inhibits fluid communication between the inlet port 550 and the outlet port 552. The second valve 508 can be a two-way, normally open solenoid-operated valve having an inlet port 560, which receives pressurized hydraulic fluid from the pump 504, an outlet port 562, which is coupled in fluid communication with an inlet of the second cylinder assembly 502, a valve element 564 and a solenoid 566. The valve element 564 is biased into a first position that permit fluid communication between the inlet port 560 and the outlet port 562. The solenoid 566 can be selectively operated to move the valve element 564 into a second position that inhibits fluid communication between the inlet port 560 and the outlet port 562. In the particular example provided, the first and second valves 506 and 508 are ball seat valves of the type that is disclosed in copending, commonly assigned U.S. patent application Ser. No. 14/153, 175 filed Jan. 13, 2014, the disclosure of which is incorporated by reference as if fully set forth in detail herein.

The first flow control device 510 can be coupled in fluid communication with the first cavity 524 and can be configured to bleed or vent hydraulic fluid from the first cylinder 520 to the reservoir 540. Similarly, the second flow control device 512 can be coupled in fluid communication with the second cavity 534 and can be configured to bleed or vent hydraulic fluid from the second cylinder 530 to the reservoir 540. The first and second flow control devices 510 and 512 can be any type of flow control device but in the particular example provided, each comprises an orifice of a predetermined diameter. Each orifice can be a discrete component that can be coupled to fluid conduits coupled to the reservoir 540 and the first cylinder 520 or the second cylinder 530, but in the particular example provided, the orifices are formed in a part of the housings (not specifically shown) that house the first and second friction clutches 414 and 416 (FIG. 2).

With reference to FIGS. 2 and 4, the hydraulic fluid in the reservoir 540 can be a fluid that is solely configured for use in the hydraulic circuit 408. Alternatively, the hydraulic fluid could be employed to lubricate the first and second clutch plates 424 and 426 of the first and second clutches 414 and 416, and optionally to also lubricate the input pinion 400, the ring gear 402, and any bearings that support the input pinion 400 or the ring gear 402 for rotation relative to the housing 398.

The control system 410 can comprise a first sensor 570, a second sensor 572 and a controller 574. The first sensor 570 can be configured to sense a parameter that is indicative of a force that is applied by the first piston 522 to the first friction clutch 414 and to responsively produce a first sensor signal. The second sensor 572 can be configured to sense a parameter that is indicative of a force that is applied by the second piston 532 to the second friction clutch 416 and to responsively produce a second sensor signal. In the particular example provided, the first and second sensors 570 and 572 are pressure sensors that are configured to sense the pressure of the hydraulic fluid in the first and second cavities 524 and 534, respectively. The controller 574 can be coupled to the first and second sensors 570 and 572, the first and second valves 506 and 508, the electric motor 538, and a vehicle network or data bus 580. The controller 574 can be configured to receive data from the vehicle network 580 and the first and second sensor signals and can responsively control the electric motor 538, for example via operation of a relay (not shown) that can be disposed in the vehicle junction box, as well as produce first and second control signals for operation of the first and second valves 506 and 508, respectively.

The first and second control signals can be modulated signals that can control the first and second solenoids 556 and 566 to move the first and second valve elements 554 and 564 to selectively close the first and second valves 506 and 508. In the particular example provided, the first and second control signals are pulse-width modulated signals that are configured to operate the first and second solenoids 556 and 566 (to thereby close the first and second valves 506 and 508) over a duration that is associated with duty cycles that are associated with the first and second control signals. It will be appreciated that the first and second valves 506 and 508 can be controlled independently of one another, which renders the operation of the rear axle assembly 26 relatively insensitive to internal leakage within the hydraulic circuit 408. Moreover, the force exerted by the first and second pistons 522 and 532 onto the first and second friction clutches 414 and 416 can be tailored so that more torque can be applied to one of the rear vehicle wheels 38 to aid in steering or stabilizing the vehicle.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle driveline component comprising:
a housing;
an input pinion received in the housing and rotatably disposed about a first axis;
a ring gear received in the housing and rotatably disposed about a second axis;
a differential assembly mounted in the housing for rotation about the second axis, the differential assembly having a differential case, a first friction clutch and a second friction clutch, the differential case being coupled to the ring gear for common rotation, the first friction clutch having a first input portion, which is coupled to the differential case for common rotation, and a first output portion, the second friction clutch having a second input portion, which is coupled to the differential case for common rotation, and a second output portion;

a hydraulic circuit comprising a reservoir, a first cylinder assembly, a second cylinder assembly, a first valve, a second valve, an electric motor, a pump, a first flow control device and a second flow control device, the reservoir being configured to hold a hydraulic fluid, the first cylinder assembly being configured to selectively actuate the first friction clutch and including a first piston that is received in a first chamber, the second cylinder assembly being configured to selectively actuate the second friction clutch and including a second piston that is received in a second chamber, the first valve being a solenoid operated, normally open two-way valve including a first valve element, a first outlet port, and a first inlet port, the first valve element being movable between a first position and a second position, the first outlet port being in fluid communication with the first chamber, the first valve element permitting fluid communication between the first inlet port and the first outlet port when the first valve element is in the first position and the first valve element inhibiting fluid communication between the first inlet port and the first outlet port when the first valve element is in the second position, the second valve being a solenoid operated, normally open two-way valve including a second valve element, a second outlet port, and a second inlet port, the second valve element being movable between a third position and a fourth position, the second outlet port being in fluid communication with the second chamber, the second valve element permitting fluid communication between the second inlet port and the second outlet port when the second valve element is in the third position and the second valve element inhibiting fluid communication between the second inlet port and the second outlet port when the second valve element is in the fourth position, the electric motor being selectively operable for driving the pump, the pump being configured to draw hydraulic fluid from the reservoir and provide pressurized hydraulic fluid to the first and second inlet ports, the first flow control device being in fluid communication with the first chamber and the reservoir when the first valve element is in the first and second positions, the second flow control device being in fluid communication with the second chamber and the reservoir when the second valve element is in the third and fourth positions.

2. The driveline component of claim 1, wherein the first and second valves are ball seat valves.

3. The driveline component of claim 1, further comprising a control unit having a first pressure sensor, a second pressure sensor and a controller, the first pressure sensor being configured to sense a pressure of the hydraulic fluid in the first chamber and responsively produce a first sensor signal, the second pressure sensor being configured to sense a pressure of the hydraulic fluid in the second chamber and responsively produce a second sensor signal, the controller being configured to operate the first valve at least partly in response to the first sensor signal, the controller also being configured to operate the second valve at least partly in response to the second sensor signal.

4. The driveline component of claim 3, wherein the controller is configured to generate a first modulated control signal and a second modulated control signal, and wherein the first valve operates in response to receipt of the first modulated control signal and wherein the second valve operates in response to receipt of the second modulated control signal.

5. The driveline component of claim 4, wherein the first and second modulated control signals are pulse width modulated signals.

6. The driveline component of claim 1, wherein the first and second flow control devices are orifices of a fixed diameter.

7. The driveline component of claim 1, wherein the first input portion comprises a plurality of first friction plates, wherein the first output portion comprises a plurality of second friction plates that are interleaved with the first friction plates.

8. The driveline component of claim 7, wherein each of the first friction plates, each of the second friction plates or each of the first and second friction plates comprise at least one spring that is configured to urge the first and second friction plates apart from one another.

9. The driveline component of claim 1, wherein the hydraulic fluid is further employed to lubricate the first and second friction clutches.

10. The driveline component of claim 9, wherein the hydraulic fluid is further employed to lubricate the input pinion and the ring gear.

11. The driveline component of claim 1, wherein the first valve includes a first biasing member that biases the first valve element toward the first position and the second valve includes a second biasing member that biases the second valve element toward the third position.

12. A vehicle driveline component comprising:

a housing;

an input pinion received in the housing and rotatably disposed about a first axis;

a ring gear received in the housing and rotatably disposed about a second axis;

a differential assembly mounted in the housing for rotation about the second axis, the differential assembly having a differential case, a first friction clutch and a second friction clutch, the differential case being coupled to the ring gear for common rotation, the first friction clutch having a first input portion, which is coupled to the differential case for common rotation, and a first output portion, the second friction clutch having a second input portion, which is coupled to the differential case for common rotation, and a second output portion; and a hydraulic operating means for hydraulically operating the first and second clutches independently of one another, the hydraulic operating means comprising a pump, a first normally open valve, a second normally open valve, a first clutch cylinder assembly, and a second clutch cylinder assembly, the first and second normally open valves being fluidly coupled in parallel with the pump, the first normally open valve including a first output, a first input, and a first valve element, the first output of the first normally open valve being coupled in fluid connection to the first clutch cylinder, the first valve element being movable between a first position wherein fluid communication is permitted between the first input and the first output and a second position wherein fluid communication through the first normally open valve is inhibited, the second normally open valve including a second output, a second input, and a second valve element, the second output of the second normally open valve being coupled in fluid connection to the second clutch cylinder, the second valve element being movable between a third position wherein fluid communication is permitted between the second input and the second output and a second position wherein fluid communication through the second normally open valve is inhibited, the first clutch cylinder being selectively operable for coupling the first input portion to the first output portion, the second clutch cylinder being selectively operable for coupling the second input portion to the second output portion.

13. The driveline component of claim 12, wherein the hydraulic operating means further comprises a first pressure sensor, which is configured to sense a fluid pressure in the first clutch cylinder assembly and responsively produce a first sensor signal, a second pressure sensor, which is configured to sense a fluid pressure in the second clutch cylinder assembly and responsively produce a second pressure signal, and a controller that is configured to produce first and second control signals based in part on the first and second sensor signals, respectively, wherein the first and second normally open valves operate in response to receipt of the first and second control signals, respectively.

14. The driveline component of claim 13, wherein the first and second normally open valves are ball seat valves.

15. The driveline component of claim 13, wherein each of the first and second control signals are pulse width modulated signals.

16. The driveline component of claim 13, wherein the hydraulic operating means further comprises first and second flow control devices, the first flow control device being configured to vent hydraulic fluid from the first clutch cylinder assembly, the second flow control device being configured to vent hydraulic fluid from the second clutch cylinder assembly.

17. The driveline component of claim 16, wherein the first and second flow control devices are orifices of a fixed diameter.

18. The driveline component of claim 13, wherein the first input portion comprises a plurality of first friction plates, wherein the first output portion comprises a plurality of second friction plates that are interleaved with the first friction plates.

19. The driveline component of claim 18, wherein each of the first friction plates, each of the second friction plates or each of the first and second friction plates comprise at least one spring that is configured to urge the first and second friction plates apart from one another.

20. The driveline component of claim 12, wherein the first valve includes a first biasing member that biases the first valve element toward the first position and the second valve includes a second biasing member that biases the second valve element toward the third position.

\* \* \* \* \*